United States Patent
Herring et al.

(10) Patent No.: US 7,523,522 B2
(45) Date of Patent: Apr. 28, 2009

(54) TWO-PIECE CONNECTOR FOR FLAT BLADE WINDSHIELD WIPER

(75) Inventors: Richard A. Herring, Granger, IN (US); Deborah Herring, legal representative, Granger, IN (US); Scott A. Koppen, Wanatah, IN (US); James L. Lytle, Crownpoint, IN (US)

(73) Assignee: Federal Mogul World Wide, Inc, Southfield, MI (US)

( * ) Notice: Subject to any disclaimer, the term of this patent is extended or adjusted under 35 U.S.C. 154(b) by 0 days.

(21) Appl. No.: 11/858,641

(22) Filed: Sep. 20, 2007

(65) Prior Publication Data

US 2008/0078051 A1 Apr. 3, 2008

Related U.S. Application Data

(60) Provisional application No. 60/826,612, filed on Sep. 22, 2006.

(51) Int. Cl.
*B60S 1/40* (2006.01)
*B60S 1/38* (2006.01)

(52) U.S. Cl. ............ 15/250.32; 15/250.43; 15/250.451; 29/428; 29/509; 29/DIG. 48

(58) Field of Classification Search ............... 15/250.32, 15/250.44, 250.43, 250.361, 250.451; 29/428, 29/897.2, 505, 509, 515, DIG. 48
See application file for complete search history.

(56) References Cited

U.S. PATENT DOCUMENTS

| | | | | |
|---|---|---|---|---|
| 2,694,827 A | * | 11/1954 | Bacher | .................... 15/250.32 |
| 3,192,551 A | * | 7/1965 | Appel | ...................... 15/250.43 |
| 3,453,680 A | | 7/1969 | Charlton | |
| 3,725,971 A | | 4/1973 | Quinlan et al. | |
| 3,838,475 A | | 10/1974 | Quinlan et al. | |
| 3,845,519 A | * | 11/1974 | Quinlan et al. | ............ 15/250.32 |
| 5,613,266 A | * | 3/1997 | Lee | ........................ 15/250.201 |
| 6,161,248 A | * | 12/2000 | Merkel et al. | ............ 15/250.32 |
| 6,192,546 B1 | | 2/2001 | Kotlarski | |
| 6,397,428 B2 | | 6/2002 | Kotlarski | |
| 6,427,283 B1 | | 8/2002 | Dietrich et al. | |
| 2007/0180643 A1 | | 8/2007 | Kim | |

FOREIGN PATENT DOCUMENTS

| | | | | |
|---|---|---|---|---|
| EP | 1564094 | * | 8/2005 | |
| FR | 2774341 | * | 8/1999 | |

* cited by examiner

*Primary Examiner*—Gary K Graham
(74) *Attorney, Agent, or Firm*—Robert L. Stearns; Dickinson Wright PLLC

(57) ABSTRACT

A central connecting device (36) for a flat blade style wiper blade assembly (20) includes a plastic intermediate base (38) that is fixed, such as by ultrasonic welding, to a pair of flexors (26) extending the length of the wiper blade assembly (20). The intermediate base (38) includes a recessed deck section (42) for receiving a metallic housing (54). The housing (54) is heat-staked in position to the intermediate base (38) to secure the two elements together as an integral unit. A rivet (78) extends transversely across the sidewalls (58) of the housing (54) for adjoining to a universal connector (82) or other suitable adaptor or by direction connection to the end of a wiper arm.

11 Claims, 10 Drawing Sheets

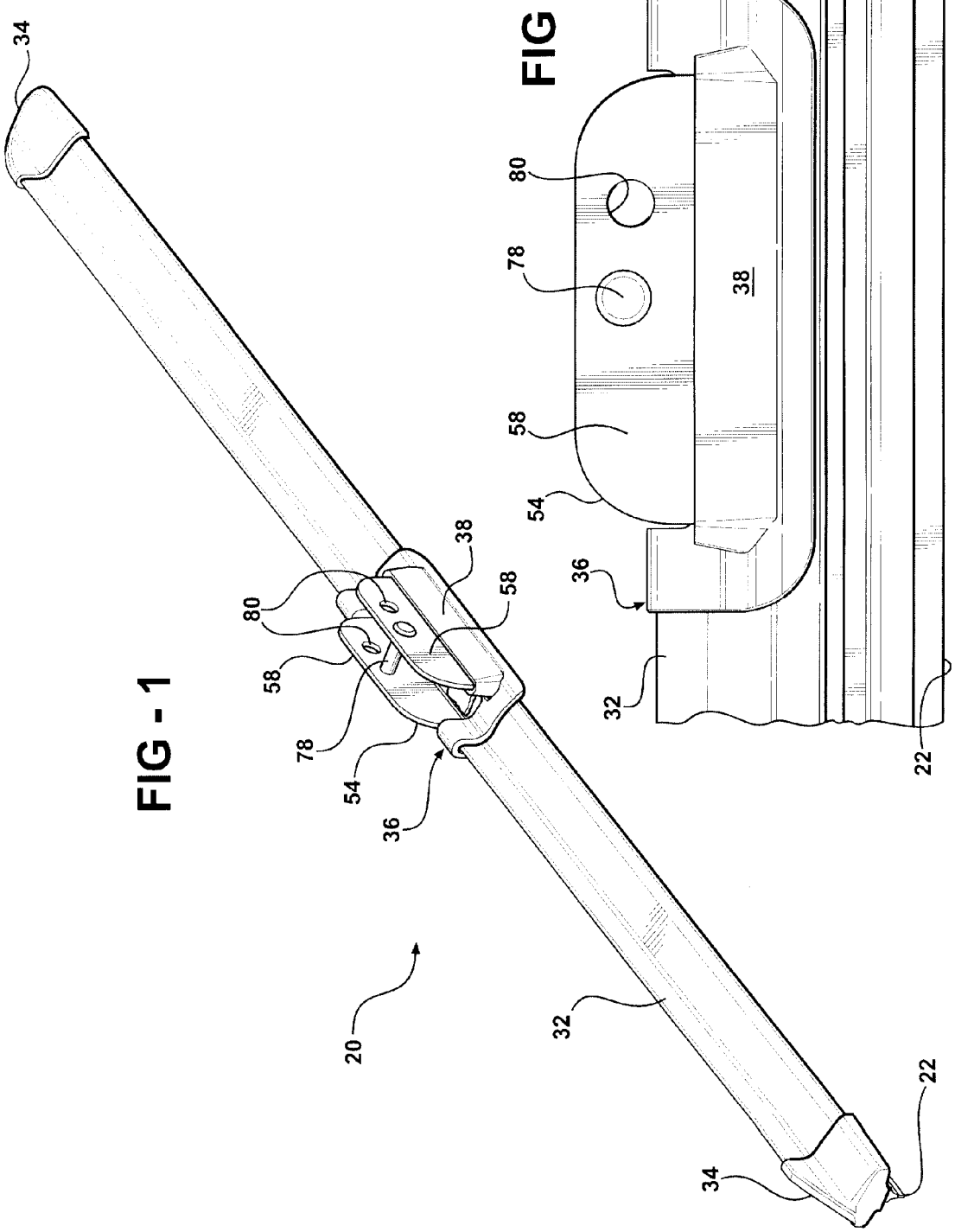

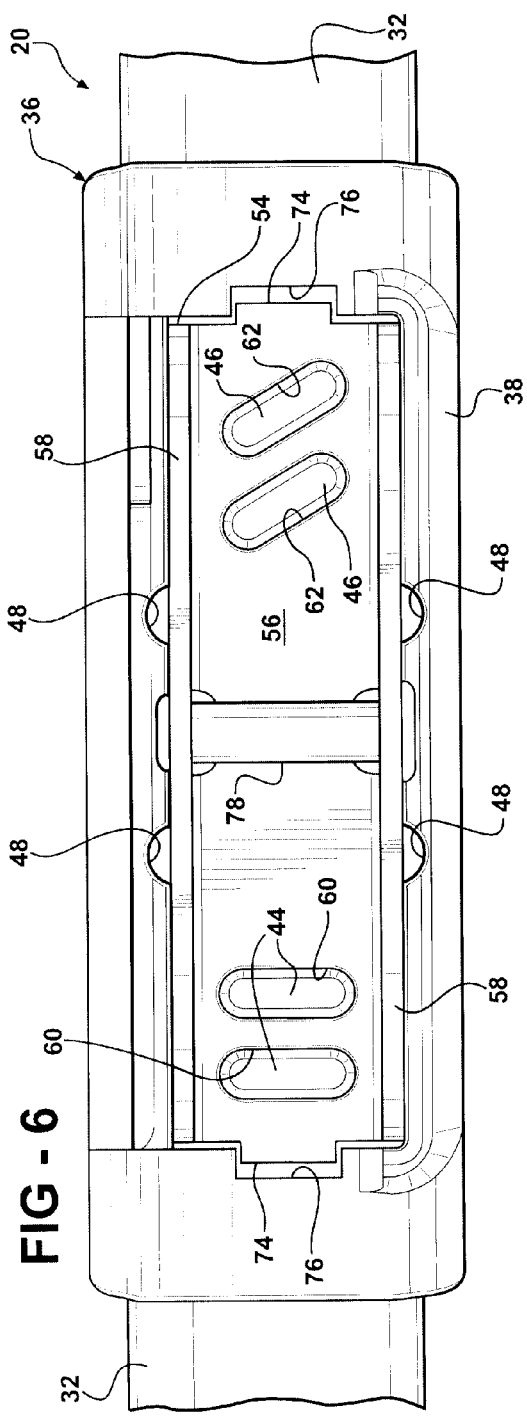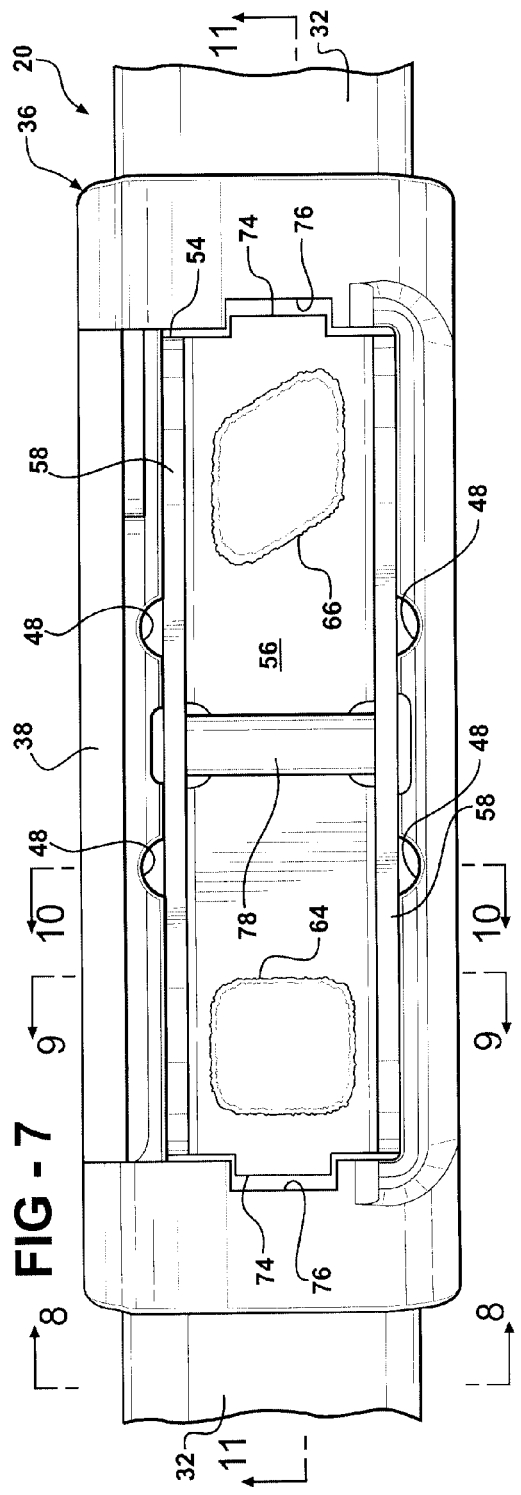

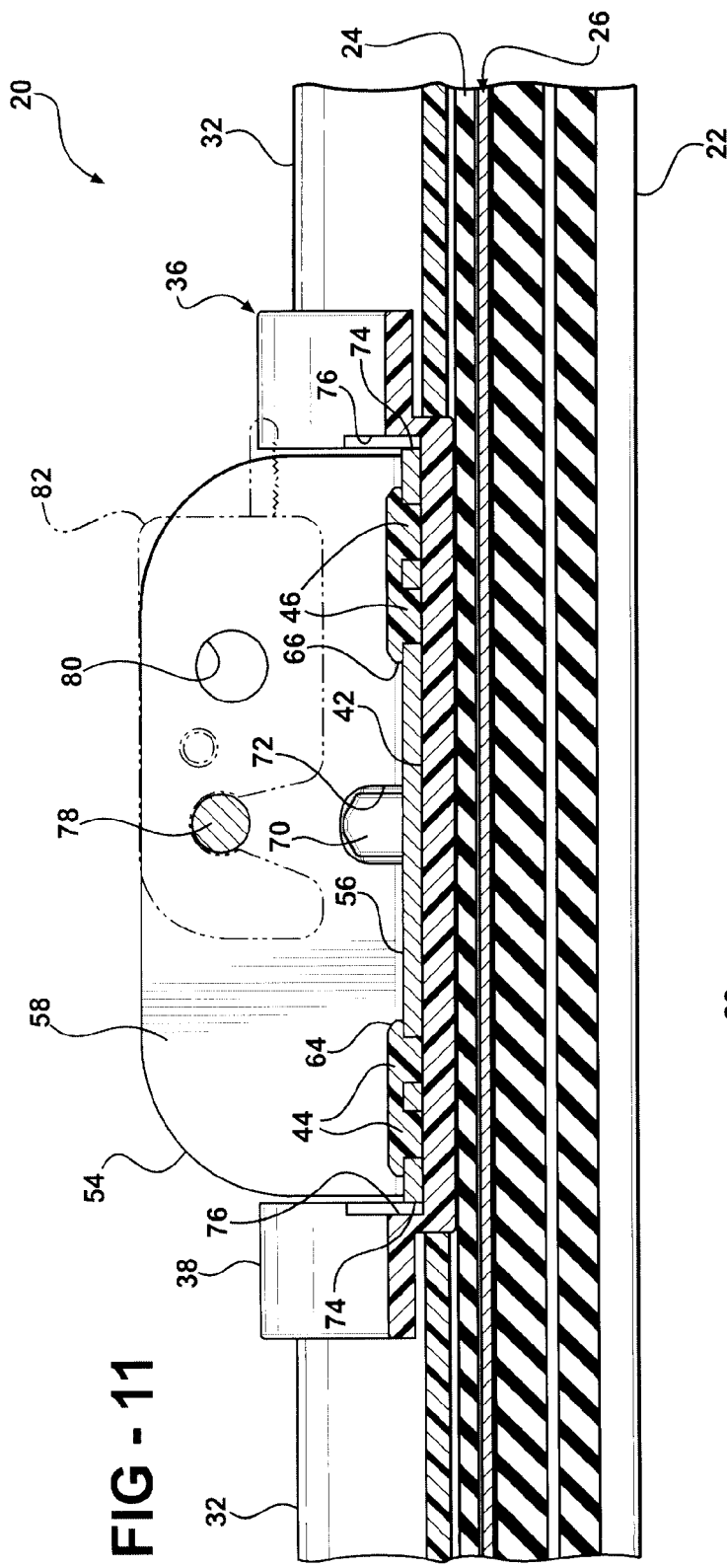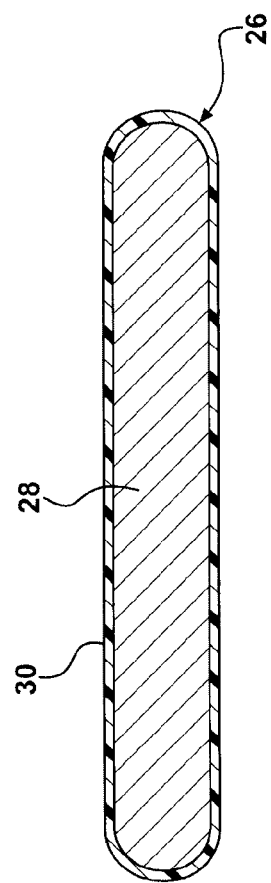

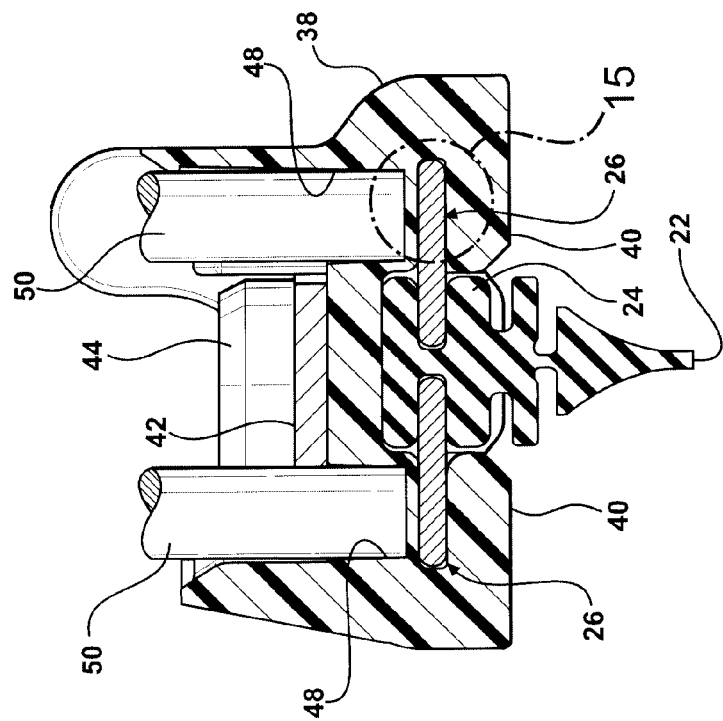
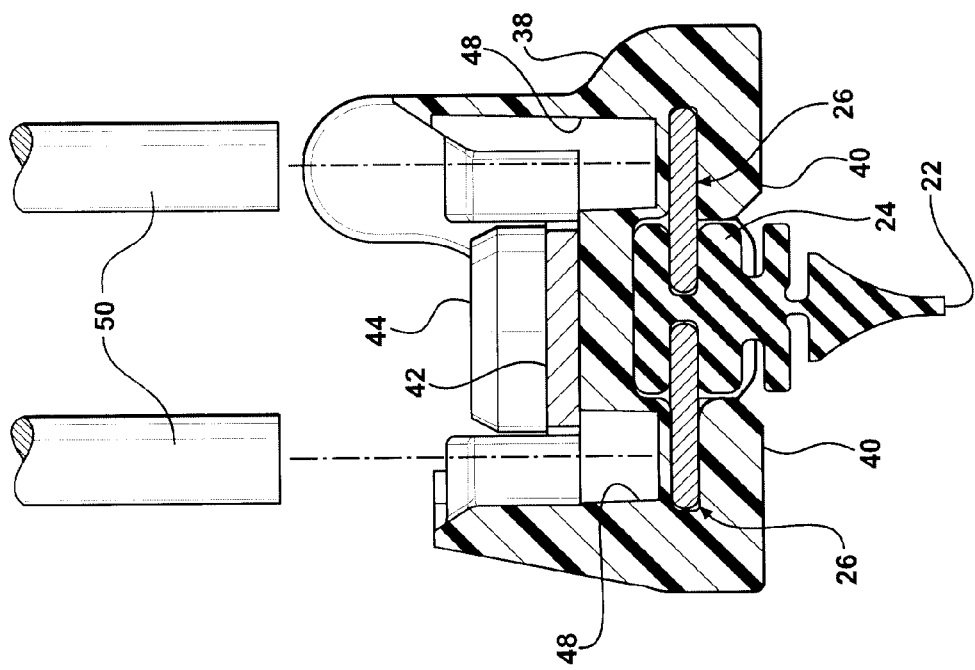

TWO-PIECE CONNECTOR FOR FLAT BLADE WINDSHIELD WIPER

CROSS REFERENCE TO RELATED APPLICATIONS

This application claims priority to U.S. Provisional Application Ser. No. 60/826,612 filed Sep. 22, 2006.

BACKGROUND OF THE INVENTION

1. Field of the Invention

The subject invention relates to a central connection device for a flat blade style wiper as used to clear the windshield of a motor vehicle.

2. Related Art

Windshield wipers are generally known. An emerging trend in windshield wipers are the so-called flat blade or yokeless wiper, which are distinguished from the prior generation wipers by the absence of yoke segments used to distribute contact pressure along the length of the wiper element. A flat blade wiper distributes contact pressure through one or more flexor elements preformed to a specific curvature. Typically, a spoiler is attached along the entire length of the wiper blade to combat wind lift at high driving speeds.

The wiper blade connects to the outer end of an oscillating or sweeping wiper arm through a central connection device. The central connection device is usually fixed on to the upper side of the wiper blade, generally mid-way along its length. Much attention has been given to the configuration of the central connection device, together with the method in which it is fixed to the flexor or other components of the wiper blade. One issue which has developed in connection with proprietary connector designs is that the end of the wiper arm is specially shaped to mate with only proprietary-shaped connection devices on the wiper blade. This, therefore, precludes the installation of these newer, flat blade wipers onto automobiles having older style wiper arms.

Furthermore, there is a need to provide a connection system for a flat blade style wiper which is strong, inexpensive, and adaptable for use with older generation, so-called yoke style wiper blades. There is also a need for a central connection device for a flat blade wiper that is lightweight, easy to manufacture, and easy to assemble.

SUMMARY OF THE INVENTION

The invention relates to a windshield wiper blade assembly of the type connected to the sweeping, i.e., oscillating, end of a wiper arm. The subject assembly comprises at least one elongated flexor having a naturally curved condition but resiliently flexible to flatten and conform to the shape of a windshield when pressed there against. A wiper element is carried by the flexor for directly contacting a windshield to wipe water therefrom. A connecting device is affixed along the length of the flexor for providing a connection point to the sweeping end of the wiper arm. The connecting device includes a rigid housing having a floor section and at least one upstanding sidewall adjoining the floor section. The floor section includes at least one shaped keyway formed therein. The connecting device further includes an intermediate base interposed between the flexor and the housing. The intermediate base has a deck section directly connected to the flexor and the floor section of the housing. The deck section includes at least one upstanding key extending through the shaped keyway. The key includes a lip overhanging the floor section for securing the housing in an operative position with respect to the flexor.

A windshield wiper blade assembly made according to this invention, wherein the connecting device is a two part construction comprised of a housing and an intermediate base, is easy to manufacture and assemble. Furthermore, the manner in which the housing is connected to the intermediate base yields a strong, lightweight system. Furthermore, a connecting device made according to this invention is conveniently adaptable for use with older generation, yoke-style wiper blades, as well as with proprietary connection configurations present in some applications.

The invention also contemplates a method for assembling a central connecting device to a windshield wiper blade of the type connected to the sweeping end of a wiper arm. The method comprises the steps of: providing at least one flexor having a plastic upper surface and a bottom surface, joining a wiper element to the flexor so that the wiper element extends laterally from the bottom surface of the flexor, providing an intermediate base component of a connecting device, the intermediate base having a deck section with a plastic lower surface and at least one upstanding key, positioning the lower surface of the deck against the plastic upper surface of the flexor, welding the deck section to the flexor, providing a rigid housing having a floor section and at least one upstanding sidewall, the floor including at least one shaped keyway formed therein, coupling the housing to the intermediate base by positioning the deck section side-by-side with the floor section of the housing so that the at least one upstanding key matingly extends through the shaped keyway in the floor, and extending a lip on the key over the floor section so as to secure the housing in an operative position with respect to the flexor. The connecting device made according to this assembly technique provides a strong, inexpensive connection point to the sweeping end of a wiper arm which is easily manufactured.

BRIEF DESCRIPTION OF THE DRAWINGS

These and other features and advantages of the present invention will become more readily appreciated when considered in connection with the following detailed description and appended drawings, wherein:

FIG. 1 is a perspective view of a windshield wiper blade assembly according to the subject invention, with the flexor and wiper element portions shown in a flattened, operative condition and with the natural, curved state of the flexors depicted in phantom;

FIG. 2 is a fragmentary side elevation view of the wiper blade assembly illustrating the connecting device of the subject invention;

FIG. 6 is an enlarged fragmentary view of the connecting device shown in an intermediate assembly condition wherein the keys have not yet been heat-staked;

FIG. 7 is a view as in FIG. 6 but illustrating a post-assembly condition wherein the tops of the keys have been heat-staked so as to secure the housing in an operative position with respect to the flexors;

FIG. 11 is a cross-sectional view taken generally along lines 11-11 of FIG. 7;

FIG. 12 is an enlarged cross-sectional view taken through a flexor according to a preferred embodiment of the invention, wherein the flexor is depicted comprising a metallic core enveloped in a plastic skin;

FIG. 13 is a cross-sectional view illustrating an assembly operation wherein the intermediate base is prepared to be ultrasonically welded to the flexors, with ultrasonic welding probes positioned immediately above the intermediate base;

FIG. 14 is a view as in FIG. 13, but showing a further progression in the ultrasonic welding step, wherein the ultrasonic probes are temporarily seated in weld sockets so as to generate ultrasonic vibrations and accomplish a weld between the intermediate base and each of the flexors;

DETAILED DESCRIPTION OF THE PREFERRED EMBODIMENT

Figure 9:
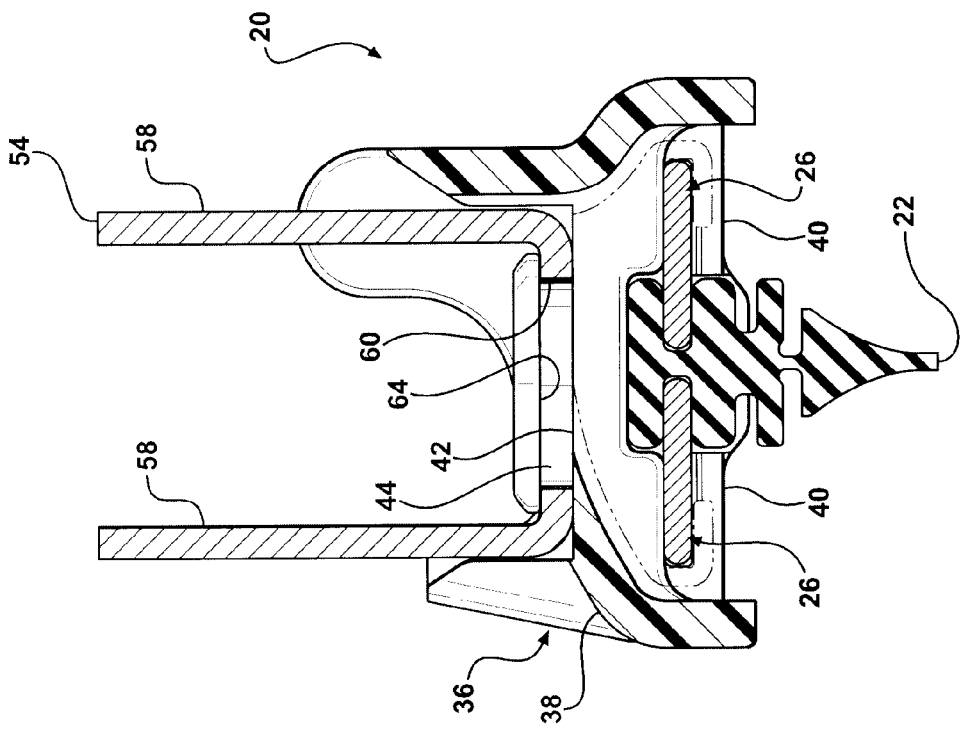
FIG. 9 is a cross-sectional view taken generally along lines 9-9 of FIG. 7.
Figure 8:
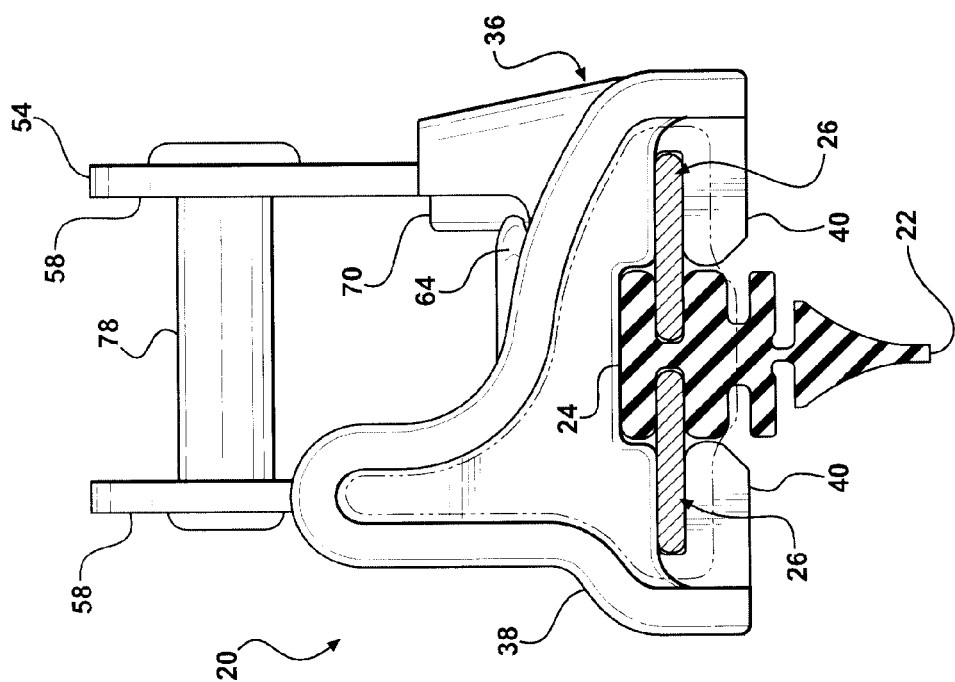
FIG. 8 is a cross-sectional view taken generally along lines 8-8 of FIG. 7.
Figure 10:
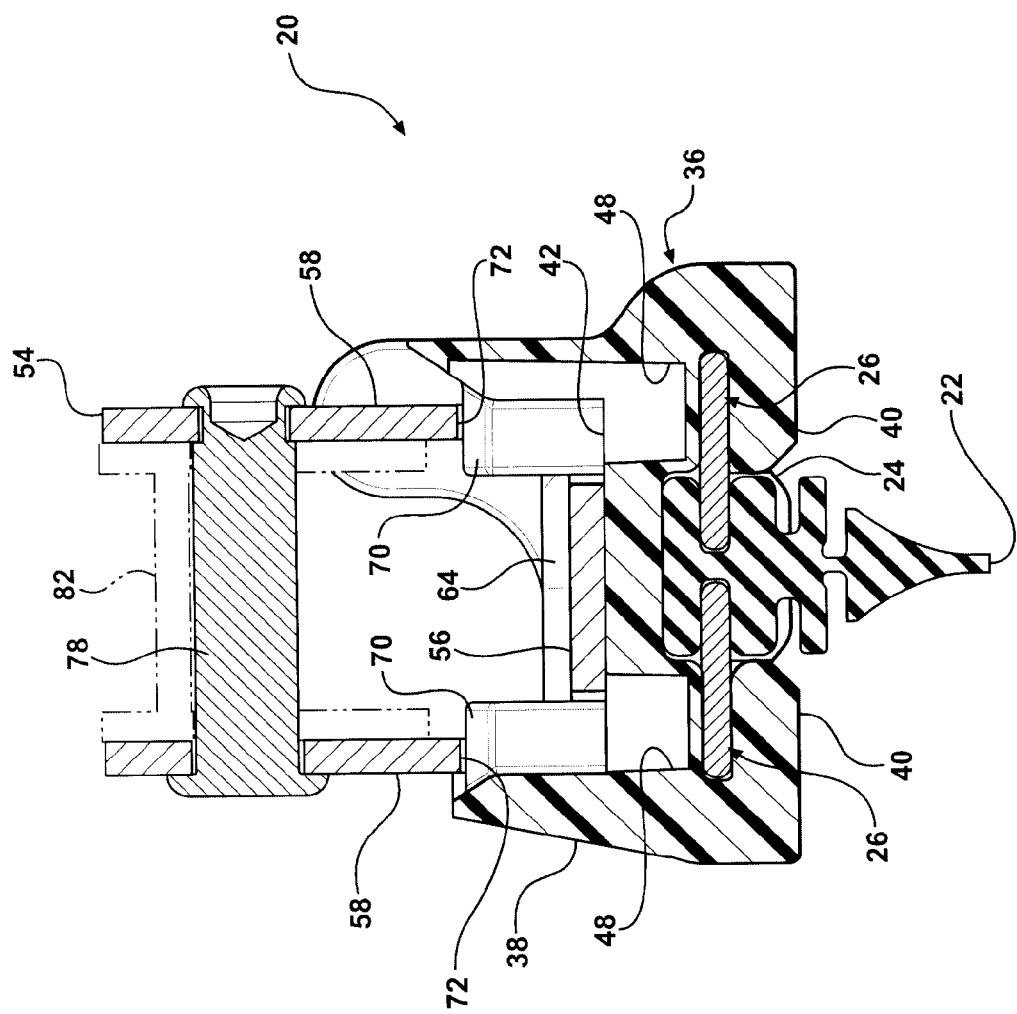
FIG. 10 is a cross-sectional view taken generally along lines 10-10 of FIG. 7.

Referring to the Figures, wherein like numerals indicate like or corresponding parts throughout the several views, a so-called flat or yokeless style windshield wiper blade assembly is generally shown at 20 in FIG. 1. The wiper blade assembly 20 includes an elongated rubber wiper element 22 adapted for direct contact against the windshield of a motor vehicle for scraping water and snow from the windshield as the blade assembly 20 is swept back and forth in an oscillating, repetitive pattern. As perhaps best shown in the cross-sectional view of FIGS. 8-10, the wiper element 22 includes an upper body section 24 captured between a pair of side-by-side flexors, generally indicated at 26. The flexors 26 are preferably, but not necessarily, made from a spring steel or other highly resilient material formed with a curvature in its natural state. While the flexors 26 are, in the preferred embodiment here described as arranged in a side-by-side pair, alternative constructions may employ only one flexor or more than two flexors to accomplish the objectives for the wiper blade assembly, which is to provide an optimal distribution of contact pressure along the length of the wiper element 22, as against the windshield of a motor vehicle (not shown). In FIG. 12, a cross-section through a typical flexor 26 is illustrated, and depicts a construction comprised of a metallic core 28 substantially enveloped in a plastic skin 30. This preferred construction is not required, however, as other applications may permit all plastic or composite flexor designs, or substantially all metallic designs with only a small portion of plastic disposed on the upper surface of the flexors against which the connecting device is mounted, as will be described subsequently.

Spoilers 32 may be attached to the outboard, i.e., laterally spaced, edges of the flexors 26, similar to that depicted in applicant's co-pending U.S. Application No. 2005/1072443, published Aug. 11, 2005, the entire disclosure of which is hereby incorporated by reference. The spoilers 32, although an optional feature, help maintain an even pressure of the wiper element 22 against a windshield even during high driving speeds. Endcaps 34 snap-connect to the flexor 26 ends and surround the outermost end of each spoiler 32 to establish a finished, terminal end piece.

The inboard end of each spoiler 32 is spaced from the other spoiler 32 so as to provide a clearance approximately midway along the length of the flexors 26. This clearance is provided to receive a central connecting device, generally indicated at 36. The connecting device 36 is permanently affixed to the flexors 26 and serves to provide a connection point for the end of a wiper arm (not shown). The connecting device 36 also serves to capture and protect the inboard ends of the spoilers 32, so that each spoiler 32 is trapped in a longitudinal direction between a respective endcap 34 and the connecting device 36.

Figure 3:
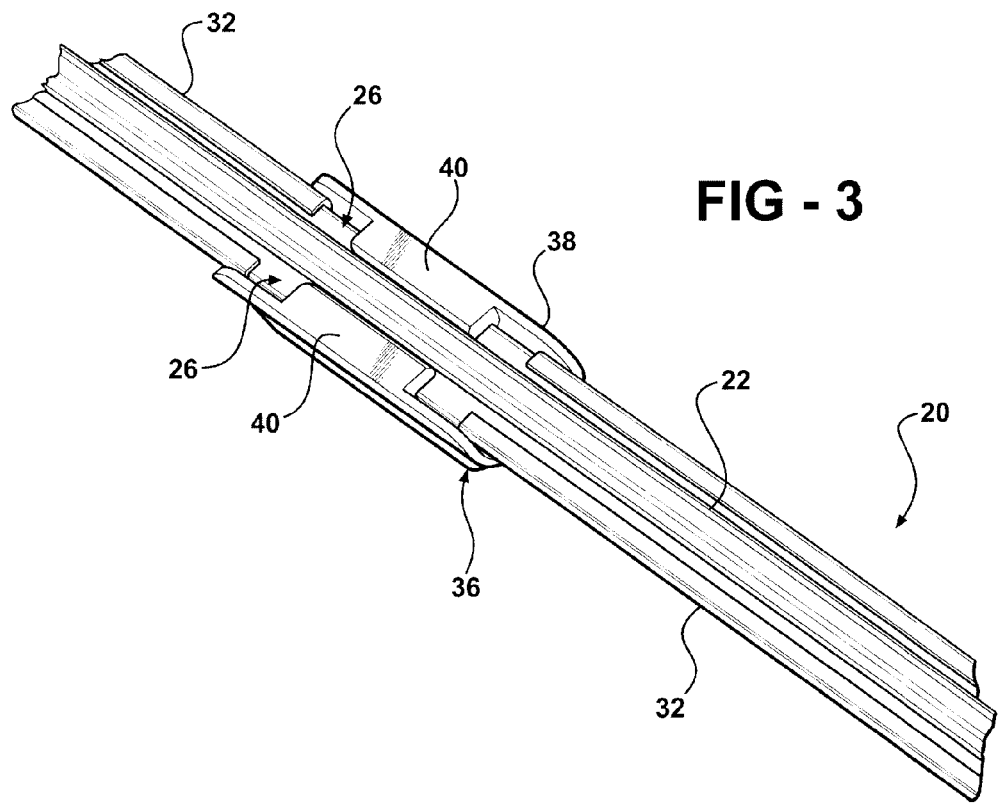
FIG. 3 is a fragmentary, bottom perspective view of the central connecting device as it engages the flexors.
Figure 4:
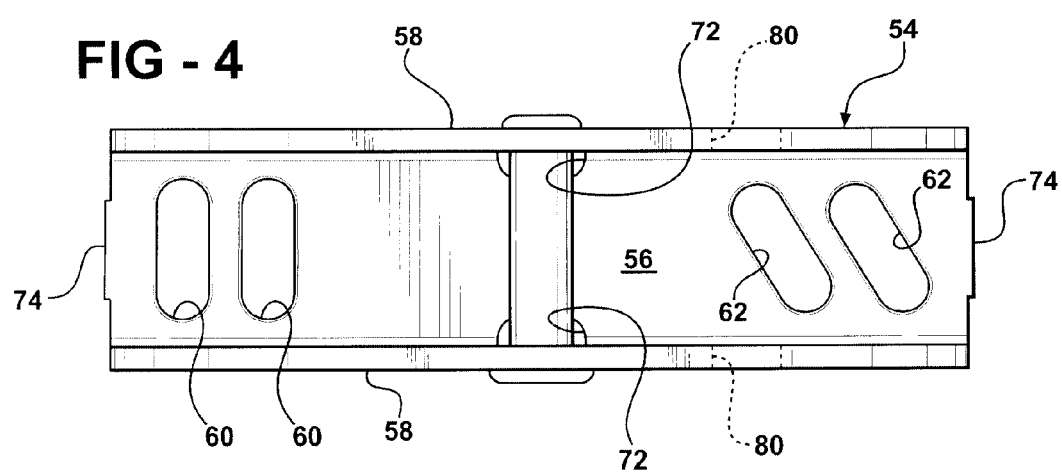
FIG. 4 is a top view of the housing component of the connecting device.
Figure 5:
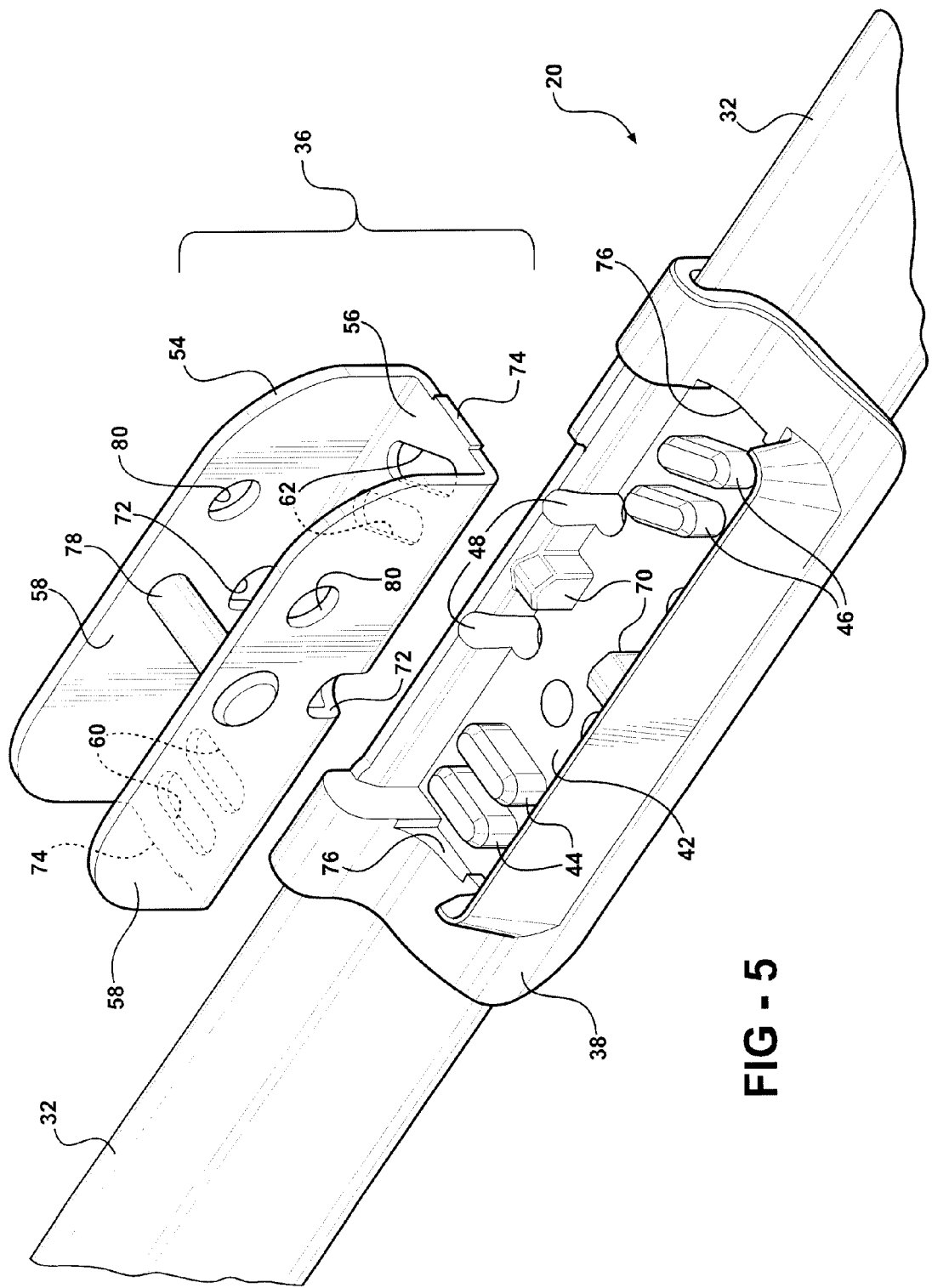
FIG. 5 is an exploded perspective view depicting the housing separated away from the intermediate base such as during the assembly process.

The connecting device 36 includes an intermediate base 38, preferably fabricated from a plastic material. During the assembly process, the intermediate base 38 may be slid along the flexors 26 to its designated operative position. The intermediate base 38 includes a pair of cuffs 40 on the bottom side thereof as shown in FIG. 3. The cuffs 40 wrap around the laterally spaced side edges of the flexors 26 to provide lateral stability in addition to the welded fixation points, which will be described below. The intermediate base 38 also includes a deck section 42 on the top side thereof. The deck section 42 is shown in FIG. 5 in the form of a depressed area forming a receiving pocket. The deck section 42 overlies the flexors 26. At least one, but preferably a plurality of upstanding keys 44, 46 protrude upwardly from the deck section 42. The keys 44, 46 may take any of a variety of forms. However, in the embodiment illustrated herein, the keys 44 comprise a pair of generally oval, or oblong features oriented generally transverse to the longitudinal extent of the wiper blade assembly 20. By contrast, the keys 46 comprise a pair of parallel, generally oval features oriented obliquely or angularly relative to the longitudinal extent of the blade assembly 20. The non-symmetrical nature of the keys 44 relative to the keys 46 provide a polarization, or poke-yoke, feature to prevent backward installations. The longitudinal ends of the intermediate base 38 are formed in a profile generally matching the profile of the spoilers 32 so that the ends of each spoiler 32 can be captured by the intermediate base 38.

Figure 15:
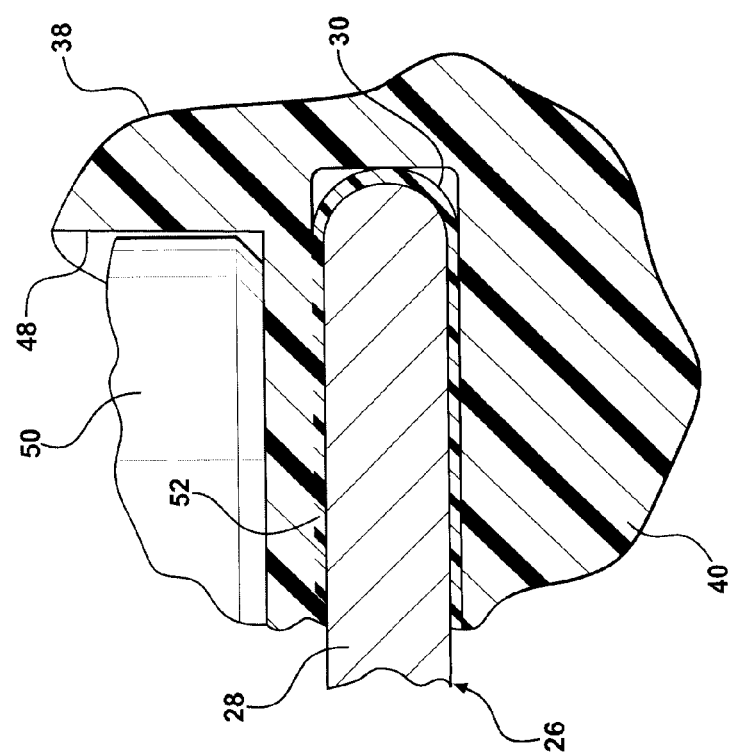
FIG. 15 is an enlarged view of the welded region between the plastic base and a flexor as indicated by the circumscribed area 15 in FIG. 14.

Referring now to FIGS. 13-15, the method of attaching the intermediate base 38 to the flexors 26 is depicted. A plurality, in this case four, weld sockets 48 are formed in the recessed region of the deck section 42. These weld sockets 48 receive probes 50 like that illustrated in FIGS. 13 and 14. The probes 50 descend into the weld sockets 48 until they make contact with the plastic intermediate base 38, as shown in FIG. 14. The probes 50 are then vibrated at high frequency, typically at ambient temperature, to create a material bond between the plastic intermediate base 38 and the plastic skin 30 surrounding each of the flexors 26. This material bond is shown by the weld region 52 in FIG. 15. Depending upon the vibrational frequency and other process parameters, an additional material bond may form between the plastic coating skin 30 and the underlying cuffs 40. In any event, a secure, fixed connection is established between the intermediate base 38 and the flexors 26 via this ultrasonic welding technique.

Once the intermediate base 38 has been securely attached to the flexors 26 via the mechanical features of the cuffs 40 and the material bonds represented by the weld region 52, a rigid, preferably metallic housing 54 is loaded into the recessed deck section 42, as shown in FIG. 5. The housing 54 includes a floor section 56 and at least one upstanding sidewall 58 adjoining the floor section 56. However, in the preferred embodiment illustrated in the Figures, the housing 54 is essentially U-shaped having a pair of opposing sidewalls 58 extending upwardly from the floor section 56. The floor section 56 includes keyways 60, 62 shaped and oriented to receive the respective keys 44, 46 as shown in FIG. 11.

Figure 16A:
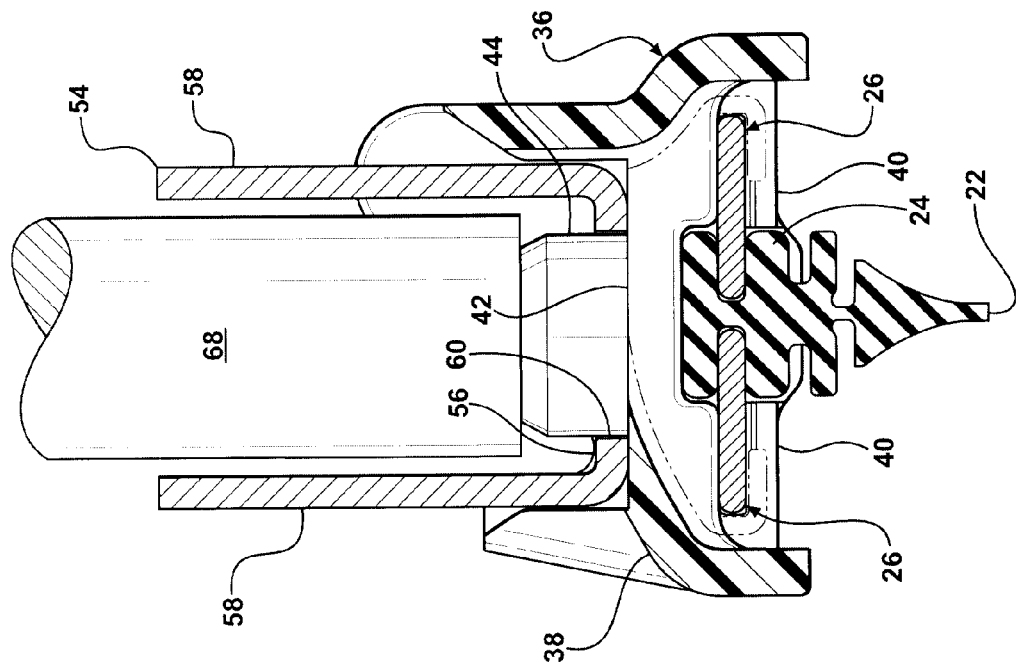
FIGS. 16A-C illustrate a progression in the forming process wherein the housing is securely attached to the intermediate base in an exemplary heat-staking operation so as to form a lip on the upstanding keys which overhangs the floor section of the housing.
Figure 16B:
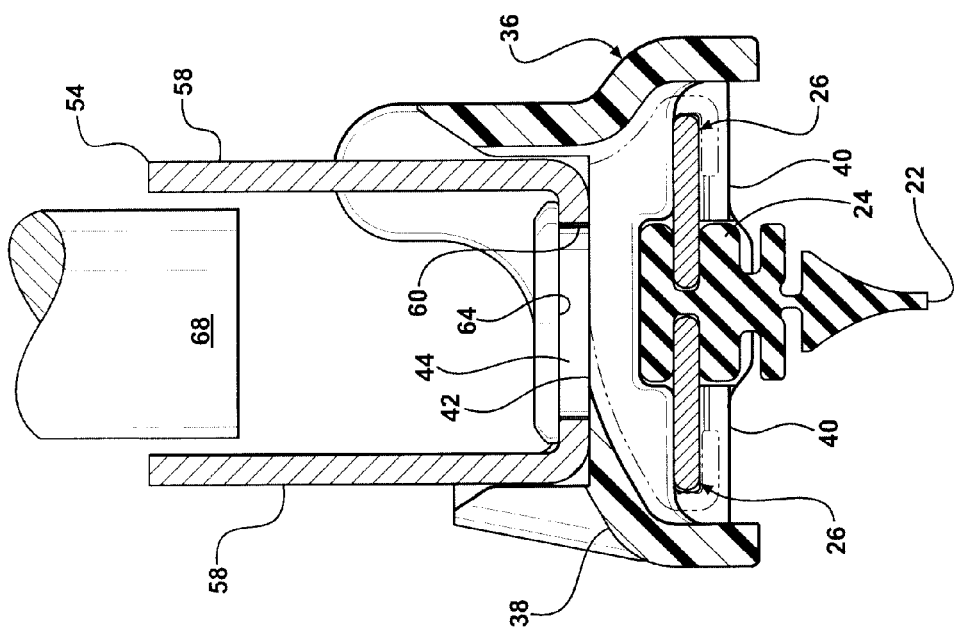
Figure 16C:
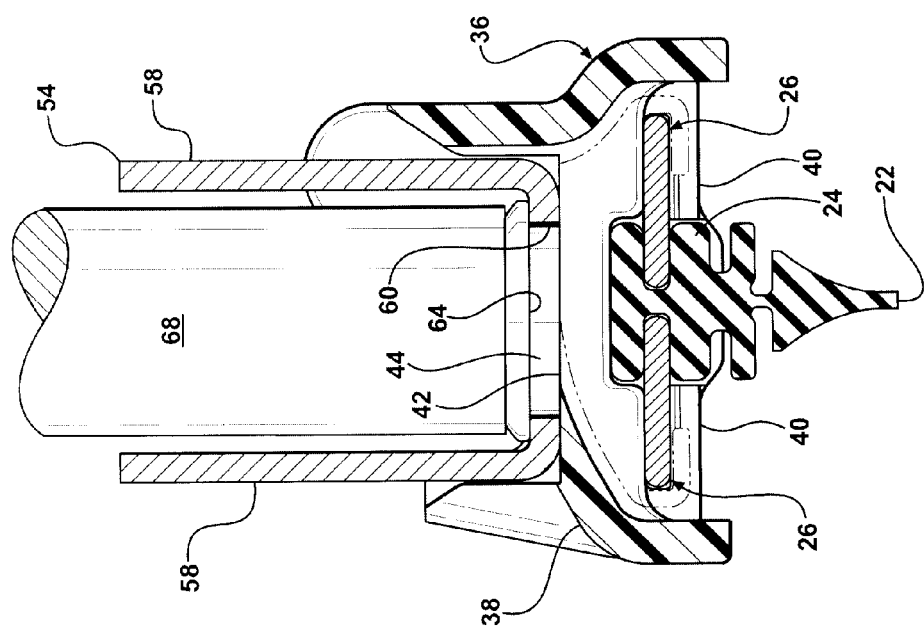

The keys 44, 46 include respective lips 64, 66 which overhang the floor section 56 for securing the housing 54 in an operative position with respect to the flexors 26. Although various methods may be employed to achieve lips 64, 66 which function in accordance with the objectives of this invention, including pawls, latches, barbs and the like, in the preferred embodiment of this invention the lips 64, 66 are formed in a heat-staking operation like that illustrated in the progressive views of FIG. 16A-C. More specifically, during the assembly process, a heat-stake tool 68 plastically deforms the protruding tops of the keys 44, 46 in a spreading, upset configuration to mechanically lock the housing 54 into an operative position within the deck section 42 of the base 38. As shown in FIGS. 7 and 11, the heads of adjacent keys 44, 46 may melt together during the heat-staking process to form a merged, common retaining lip 64, 66 for each pair.

Referring again to FIGS. 5 and 10, the intermediate base 38 and housing 54 are shown including additional complimentary features, such as opposing lugs 70 which are received in corresponding notches 72 formed into the floor section 56 and sidewalls 58 of the housing 54. In addition, stub tabs 74 extend from each longitudinal end of the floor section 56, and are received in correspondingly shaped pockets 76 recessed together with the deck section 42. All of these features, including the shape of the pockets 76, the keys 44, 46, the lugs 70, the stub tabs 74 and the heat-staking operation cooperate to permanently and securely fix the rigid metallic housing 54 to the plastic intermediate base 38.

A metallic rivet 78 is fixed cross-wise between the sidewalls 58 of the housing 54, as shown in numerous of the Figures. Aligned through-holes 80 are spaced a short distance from the rivet 78. The rivet 78 and the through-holes 80 form part of the connection system adapted for any one of the multiple prior art style wiper arm fittings. For example, as shown in phantom in FIGS. 10 and 11, a universal connector 82 can be snap-fit over the rivet 78. The universal connector 82 forms the basis for connecting to a particular sized hook-shaped wiper arm or a side pin style wiper arm. The universal connector 82 also forms the foundation for additional adaptors which can be connected thereto for attaching to other style wiper arm ends. This universal connector and adaptor-based connection system is depicted in the applicant's own U.S. Pat. No. 5,807,016, issued Sep. 15, 1998, the entire disclosure of which is hereby incorporated by reference.

The invention also provides a method for assembling a central connecting device 36 onto a windshield wiper blade assembly 20 of the type connected to the oscillating end of a wiper arm. The method comprises the steps of providing at least one flexor 26 having a plastic upper surface and also a bottom surface. The method further includes joining a wiper element 22 to the flexor 26 so that the wiper element 22 extends from the bottom surface of the flexor 26. The method goes on to include providing an intermediate base 38 component of a connecting device 36. The intermediate base 38 has a deck section 42 with a plastic lower surface and at least one upstanding key 44, 46. The plastic lower surface of the deck section 42 is positioned against the plastic upper surface of the flexor 26, and the deck section 42 then welded to the flexor 26, such as by generating ultrasonic vibrations to form a welded region 52 therebetween. A rigid housing 54 is provided having a floor section 56 and at least one upstanding sidewall 58. The floor section 56 includes at least one shaped keyway 60, 62 formed therein. The method includes the step of coupling the housing 54 to the intermediate base 38 by positioning the deck section 38 side-by-side with the floor section of the housing 54 so that the at least one upstanding key 44, 46 matingly extends through the shaped keyway 60, 62 in the floor section 56. And furthermore, the method includes extending a lip 64, 66 on the key 44, 46 over the floor section 56 so as to secure the housing 54 in an operative position with respect to the flexors 26. The connecting device 36 so assembled provides a strong, inexpensive connection point to the sweeping end of the wiper arm, and which is easily manufactured. The step of extending the lips 64, 66 may include heat-staking the tops of the keys 44, 46 in a mushrooming operation.

Those with skill in the art will readily appreciate many additional features, construction details and assembly steps useful in or with the subject invention by reference to the accompanying figures. A wiper blade assembly 20 including a central connecting device 36 as described herein is able to connect to a variety of older style wiper arm ends, as well as any of the newer proprietary end fitting types. The central connecting device 36 is inexpensive to manufacture as a multi-part construction and provides a more secure foundation than current prior art designs. For example, by manufacturing the housing 54 from the metallic material and the intermediate base 38 from a plastic material, durability, toughness and weight can be optimized and the overall functionality of the wiper blade assembly 20 enhanced. Furthermore, the central connecting device 36 is considered stylish and blends well with the surrounding structure of the assembly 20 in terms of its aesthetic appeal.

The foregoing invention has been described in accordance with the relevant legal standards, thus the description is exemplary rather than limiting in nature. Variations and modifications of the disclosed embodiment and method of assembly may become apparent to those skilled in the art and fall within the scope of the invention as defined by the accompanying claims. Accordingly the scope of legal protection afforded this invention can only be determined by studying the following claims, and not reading therein limitations attributable merely to exemplary or preferred embodiments of the invention.

What is claimed is:

1. A windshield wiper blade assembly of the type connected to the sweeping end of a wiper arm, said assembly comprising:

at least one elongated flexor having a naturally curved condition but resiliently flexible to flatten and conform to the shape of a windshield when pressed there against;

a wiper element carried by said flexor for directly contacting a windshield to wipe water therefrom;

a connecting device affixed along the length of said flexor for providing a connection point to the sweeping end of the wiper arm;

said connecting device including a rigid housing having a floor section and at least one upstanding sidewall adjoining said floor section, said floor section including at least one shaped keyway formed therein;

said connecting device further including an intermediate base interposed between said flexor and said housing, said intermediate base having a deck section directly connected to said flexor and said floor section of said housing, said deck section including at least one upstanding key extending through said shaped keyway, said key including a lip overhanging said floor section for securing said housing in an operative position with respect to said flexor;

said deck section of said intermediate base welded to said flexor;

said intermediate base fabricated from a plastic material;

said flexor having an upper surface contiguous with said intermediate base and a lower surface, said upper surface of said flexor being fabricated from a plastic material that is welded to said intermediate base; and said flexor including a metallic core substantially enveloped in a plastic skin.

2. The assembly of claim 1 wherein said housing has a generally U-shaped configuration, and said at least one upstanding sidewall adjoining said floor section comprises a pair of sidewalls upstanding from opposing lateral sides of said floor section.

3. The assembly of claim 1 wherein said housing is fabricated from a metallic material.

4. The assembly of claim 1 wherein said at least one elongated flexor comprises a pair of flexors operatively disposed in parallel, side-by-side relationship.

5. The assembly of claim 1 wherein said at least one upstanding key includes a plurality of upstanding keys obliquely oriented relative to one another upon said deck section, and wherein said at least one shaped keyway comprises a plurality of shaped keyways in said floor section corresponding in mating fashion to said plurality of upstanding keys.

6. The assembly of claim 1 wherein said intermediate base includes at least one lug, and said housing includes at least one notch extending through both of said floor section and said sidewall, said lug received in said notch.

7. The assembly of claim 1 wherein said floor section of said housing includes at least one stub tab, and said intermediate base includes a complimentary-shaped receiving pocket for receiving said stub tab of said housing.

8. The assembly of claim 1 wherein said intermediate base includes at least two spaced apart cuffs engaged around laterally spaced side edges of said flexor.

9. A method for assembling a central connecting device onto a windshield wiper blade assembly of the type connected to the sweeping end of a wiper arm, said method comprising the steps of:

providing at least one flexor including a metallic core substantially enveloped in a plastic skin to define a plastic upper surface and a bottom surface;

joining a wiper element to the flexor so that the wiper element extends from the bottom surface of the flexor;

providing an intermediate base component of a connecting device, the intermediate base having a deck section with a plastic lower surface and at least one upstanding key;

positioning the plastic lower surface of the deck section against the plastic upper surface of the flexor;

welding the deck section to the flexor;

providing a rigid housing having a floor section and at least one upstanding sidewall, the floor section including at least one shaped keyway formed therein;

coupling the housing to the intermediate base section by positioning the deck section side-by-side with the floor section of the housing so that the at least one upstanding key matingly extends through the shaped keyway in the floor; and extending a lip on the key over the floor section so as to secure the housing in an operative position with respect to the flexor, whereby the connecting device provides a strong, inexpensive connection point to the sweeping end of the wiper arm which is easily manufactured.

10. The method of claim 9 wherein said step of welding the deck section the intermediate base includes generating ultrasonic vibrations.

11. The method of claim 9 wherein said step of extending a lip on the key includes heat-staking the top of the key.

* * * * *